(12) United States Patent  (10) Patent No.: US 7,232,133 B2
Stevens  (45) Date of Patent: Jun. 19, 2007

(54) SNOW SLED WITH DUAL-MODE BRAKING SYSTEM

(76) Inventor: Bob F. Stevens, 9103-135 Avenue, Edmonton, Alberta (CA) T5E 1N5

( * ) Notice: Subject to any disclaimer, the term of this patent is extended or adjusted under 35 U.S.C. 154(b) by 311 days.

(21) Appl. No.: 11/058,265

(22) Filed: Feb. 16, 2005

(65) Prior Publication Data

US 2006/0181037 A1  Aug. 17, 2006

(51) Int. Cl.
  *B62B 13/14*  (2006.01)
(52) U.S. Cl. .......................................... 280/16; 280/20
(58) Field of Classification Search ................ 280/845, 280/12.1, 14, 16, 21.1, 28, 21.2
  See application file for complete search history.

(56) References Cited

U.S. PATENT DOCUMENTS

| | | | |
|---|---|---|---|
| 3,642,299 A * | 2/1972 | Garcia ........................ | 280/16 |
| 3,682,495 A * | 8/1972 | Zaimi ......................... | 180/190 |
| 3,734,523 A * | 5/1973 | Field .......................... | 280/16 |
| 3,870,330 A * | 3/1975 | Hatano et al. ............... | 280/16 |
| 3,900,208 A * | 8/1975 | Hjelmquist ................. | 280/16 |
| 4,063,746 A * | 12/1977 | Hansen ........................ | 280/16 |
| 4,168,843 A | 9/1979 | Hager | |
| D311,358 S | 10/1990 | Dallaire | |
| 5,335,925 A | 8/1994 | Dolson | |
| 5,413,363 A | 5/1995 | Colin et al. | |
| 5,580,071 A | 12/1996 | Yu | |
| 6,116,622 A | 9/2000 | Gibbons | |
| 6,241,265 B1 | 6/2001 | Kovar et al. | |
| 6,349,950 B1 | 2/2002 | Levy et al. | |
| 6,575,479 B2 | 6/2003 | Combs | |

FOREIGN PATENT DOCUMENTS

| | | |
|---|---|---|
| CA | 2140328 | 1/1995 |
| CA | 2236322 | 11/1996 |

OTHER PUBLICATIONS

GT Sno Racer, Model # 651000XON internet advertisement printed Nov. 30, 2004 from Northern Tool + Equipment website: www.northerntool.com/images/product/images/5454_Ig.jpg.

* cited by examiner

*Primary Examiner*—Christopher P. Ellis
*Assistant Examiner*—Bridget Avery
(74) *Attorney, Agent, or Firm*—Donald V. Tomkins

(57) ABSTRACT

Disclosed is a snow sled with brake pedals that can be actuated operated either independently or cooperatively by foot pressure or by manual cable-brake control levers, to press the brake shoes into the snow surface over which the sled is traveling, thereby braking the sled. The brake pedals are pivotably suspended from the sled frame so that the rider's feet can rest upon them. The lower portions of the pedals form brake shoes extending downward and rearward from the foot rest portions of the pedals, such that the brake shoes can be pressed into the snow surface by applying foot pressure to the pedals. Alternatively, the brake pedals can be actuated by a bicycle-style cable-brake lever. Cable-biasing means is provided to keep the brake cable taut when the brake pedals have been partially actuated by foot pressure, so that the cable-brake system remains operatively effective at all times. The brake pedals may be interconnected by a bridging structure such that both pedals will tend to move toward the engaged position even when foot pressure is applied to only one pedal. Alternatively, the brake pedals may be independently operable, with separate cable-brake control systems.

14 Claims, 5 Drawing Sheets

SNOW SLED WITH DUAL-MODE BRAKING SYSTEM

FIELD OF THE INVENTION

The present invention relates in general to snow sleds, and in particular to snow sleds with braking systems.

BACKGROUND OF THE INVENTION

There are many known types of recreational vehicles for gliding over snow-covered surfaces. In some types of recreational snow vehicles, such as toboggans, steering is accomplished by selective shifting of the rider's weight, and braking is accomplished by the rider or riders dragging their feet against the snow-covered ground. Other types of snow vehicles include snow sleds having a bicycle-type frame with a pair of fixed rear skis or runners, and a single front ski (or, in some cases, double twin skis) steerably connected to a steering column with handlebars or a steering wheel that is controlled by the rider.

Some snow sleds of this type have no braking mechanisms: see, for example, U.S. Pat. No. 4,168,843 (Hager), U.S. Pat. No. 5,335,925 (Dolson), U.S. Pat. No. 5,580,071 (Yu), and Des. 311,358 (Dallaire). However, a variety of braking mechanisms can be found in other prior art sleds.

U.S. Pat. No. 6,241,265 (Kovar et al.) discloses a snow sled with a bicycle-type frame, twin rear skis, and twin front skis steerable by bicycle-type handlebars. Each front ski is fitted with a spring-mounted metal brake element that can be urged into the snow surface along the side of the ski to slow down the sled. Each brake element is controlled by a cable linkage to a brake lever mounted on the handlebars, in much the same fashion as cable-actuated brakes on bicycles.

U.S. Pat. No. 6,575,479 (Combs) discloses a snow sled with a bicycle-type frame, twin rear skis, and a single front ski steerable by bicycle-type handlebars. Each rear ski has a pivoting brake shoe that can be urged into the snow surface by a cable-actuated brake lever mounted on the handlebars.

The "GT Sno Racer"™ (available from Canadian Tire stores in Canada, and from Northern® Tool & Equipment in Burnsville, Minn.), has a bicycle-type frame, a rider's seat, twin rear skis, and a single front ski steerable by a steering wheel mounted to the frame. This sled has a braking system incorporating a pair of spring-mounted brake pedals mounted below the front portion of the frame. Each brake pedal has a foot rest section, plus a generally planar snow-engaging brake pad that extends both downward and rearward away from the foot rest section. The pedals are mounted to a bracket (or brackets) disposed forward of the pedals. The bracket is suspended beneath the frame so as to be pivotable about a generally horizontal axis. The pedals have biasing means (such as a spring) that will tend to maintain the pedals in a neutral or disengaged position, wherein the brake pads are above the plane of the undersides of the skis.

When the sled is in use, the rider places his or her feet on the corresponding foot rest sections of the brake pedals, with the pedals in the neutral position. When wishing to stop or slow down, the rider exerts foot pressure on the brake pedals, causing the brake pads to pivot forward and be urged into the snow surface over which the sled is moving. This has the effect of slowing the forward movement of the sled, generally in accordance with the amount of force with which the brake pads are urged into the snow surface. When foot pressure on the pedals is relaxed or release, the biasing means pivots the pedals back toward the neutral position.

The prior art sleds described above represent improvements over sleds that do not have braking mechanisms, but they each have disadvantages or shortcomings. The brake elements of the Kovar sled have a narrow profile, and therefore present considerably less resistance (and thus generate considerably less braking force) than the wider brake elements of the Combs sled and the GT Sno Racer™. The braking systems of both the Kovar and Combs sleds are cable-operated, with separate braking elements on skis on each side of the sled. In the event that one of the cables breaks or otherwise becomes inoperative, the sled will have braking on one side only, which can be more dangerous than having no braking at all; e.g., applying braking to one side only to a fast-moving sled may cause the sled to skid out of control due to the lateral offset of the braking force.

This potential problem is eliminated in the GT Sno Racer™, in which the braking force is always essentially aligned with the centerline of the sled. However, with the foot-operated brakes of the GT Sno Racer™, it is difficult to apply small increments of braking force that may be desirable or advantageous for optimal maneuvering of the sled in certain situations, such as when the rider wishes to execute "trick riding" maneuvers. Moreover, the brake pedals of the GT Sno Racer™ are structurally interconnected such that it is difficult or impossible to apply braking force to one pedal without applying some amount braking force to the other pedal, due to the inherent structural stiffness of the brake pedal assembly. This structural arrangement hinders or precludes the use of differential braking techniques which may be desirable for some sled maneuvers.

For the foregoing reasons, there is a need for a snow sled braking system that provides for effective and substantially "centerline" braking for optimal control and stability when rapid or emergency braking is desired, while also facilitating the application of small increments of braking force for enhanced sled maneuverability. There is a further need for braking systems which, in addition to the features described above, also allow differential braking (i.e., independent deployment of separate brake pedals). The present invention is directed to these needs.

BRIEF DESCRIPTION OF THE INVENTION

In general terms, the present invention is a snow sled with a braking system with brake elements that can be actuated operated by foot pressure or by an auxiliary brake actuation system that uses hand-operated cable actuators, or by a combination of the two brake actuation systems. The brake pedals are positioned laterally equidistant from the frame's longitudinal centerline, such that when braking force is applied equally to both pedals, the resultant braking force will be substantially in alignment with the frame centerline, thus promoting directional stability during hard braking.

The brake pedals may be interconnected by a bridging structure such that both pedals will tend to move toward the engaged position even when foot pressure is applied to only one pedal. In this embodiment, the auxiliary brake actuation system comprises a sheathed cable connected at one end to the underside of the bridging structure at a point below the pivot axis of the pedal assembly, and at the other end connects to a bicycle-style actuator lever mounted to the sled's handlebars or steering wheel. Squeezing the actuator lever exerts a tensile force on the cable which is in turn applied to the brake pedal assembly at a point below the brake pedal pivot axis, thus rotating the brake shoes toward the front of the sled. This causes the brake pads to move forward and downward, and ultimately below the plane of the skis. Accordingly, when the sled is being used on a snow surface, the brake pads may be deployed in the engaged position (i.e., brakingly engaging the snow surface) either by applying foot pressure to the foot rest sections of the brake pedals, or by squeezing the actuator lever, or by doing both.

In an alternative embodiment, the brake pedals are independently mounted to the sled frame and have independent cable-type auxiliary actuation systems. This arrangement allows even greater differential braking ability, while maintaining full, non-eccentric foot-braking capability in the event of failure of one or both auxiliary cable braking systems.

Accordingly, in one embodiment the present invention is a snow sled, for gliding over a snow surface, said snow sled comprising:
(a) a frame having a seat for a rider;
(b) one or more ski runners mounted to the frame;
(c) handlebar means mounted to the frame;
(d) a pair of laterally spaced brake pedals, each comprising:
  d.1 a foot rest section having an upper end and a lower end; and
  d.2 a brake pad section having an upper end and a lower end, the upper end of said brake pad section being rigidly connected to the lower end of the foot rest section, such that the brake pad section extends downward and rearward away from the foot rest section;
  said brake pedals being mounted to the frame and pivotable about a horizontal axis transverse to the longitudinal centerline of the frame, with the foot rest sections accessible to the rider's feet; and
(e) cable-actuated auxiliary brake control means; wherein the brake pedal may be moved from a neutral position in which the brake pads are stowed above the snow surface, to an engaged position in which the lower ends of the brake pads are urged into the snow surface, by application of foot pressure to the foot rest sections or by actuation of the auxiliary brake control means.

In the preferred embodiment, the brake pedals are interconnected by a bridging member extending laterally between the brake pedals, such that the brake pedals will move in concert upon actuation of the auxiliary brake control means, and the auxiliary brake control means comprises:
(a) a brake lever assembly mounted to the handlebar means and comprising:
  a.1 a lever housing having an upper sheath retainer; and
  a.2 a lever hingingly mounted to the lever housing;
(b) a lower sheath retainer mounted to the sled frame;
(c) a flexible cable sheath extending between the upper and lower sheath retainers; and
(d) a flexible brake cable passing through the cable sheath and being connected at one end to the lever and at the other end to the bridging member;

the points of connection of the brake cable to the lever and the bridging member being selected such that depression of the lever will cause partial withdrawal of the brake cable through the upper end of the sheath, and consequently exerting a tensile force on the bridging member so as to move the brake pedals toward the engaged position.

In the preferred embodiment, the auxiliary brake control means also includes cable-tensioning means, for keeping the brake cable from slackening when the brake pedals are actuated by foot pressure. This ensures that actuation of the brake lever will cause the brake cable to exert a tensile force on the brake pedal assembly regardless of the position of the brake pedals prior to actuation of the brake lever. In one particular embodiment, the cable-tensioning means comprises a cable guide element engaged with the brake cable at a point between the lower cable retainer and the bridging member, plus a tension spring connected at one end to the cable guide element and at the other end to a selected point on the sled frame, with the spring being pre-tensioned such that the brake cable will remain taut at all times when the lever is not depressed, and irrespective of the position of the brake pedals. The cable guide element may comprise a sleeve through which the brake cable slides; this sleeve may be similar to the bent plate clips commonly used in association with bicycle brake cables.

In alternative embodiments of the invention, the brake pedals are independently operable, with separate auxiliary brake control means.

Various designs and configurations of the skis or runners of the snow sled may be used without departing from the present invention. For example, the sled may have a single or double front skis, or single or double rear skis, or some combination of these. In one alternative embodiments, the sled has only one ski extending the length of the frame. The single ski of this embodiment is comparatively wide, and has one or more openings for the brake pedals.

The handlebar means may be rigidly fixed to the sled frame. In the preferred embodiment, however, the sled has a steerable front ski, and the handlebars are connected to a steering shaft swivellingly mounted to the frame in a fashion similar to that well known in the field of bicycle construction, with the lower end of the steering shaft being connected to the front ski, such that the orientation of the front ski, and in turn the travel direction of the sled, may be controlled by manipulation of the handlebars.

BRIEF DESCRIPTION OF THE DRAWINGS

Embodiments of the invention will now be described with reference to the accompanying figures, in which numerical references denote like parts, and in which.

DETAILED DESCRIPTION OF THE PREFERRED EMBODIMENT

Figure 1:
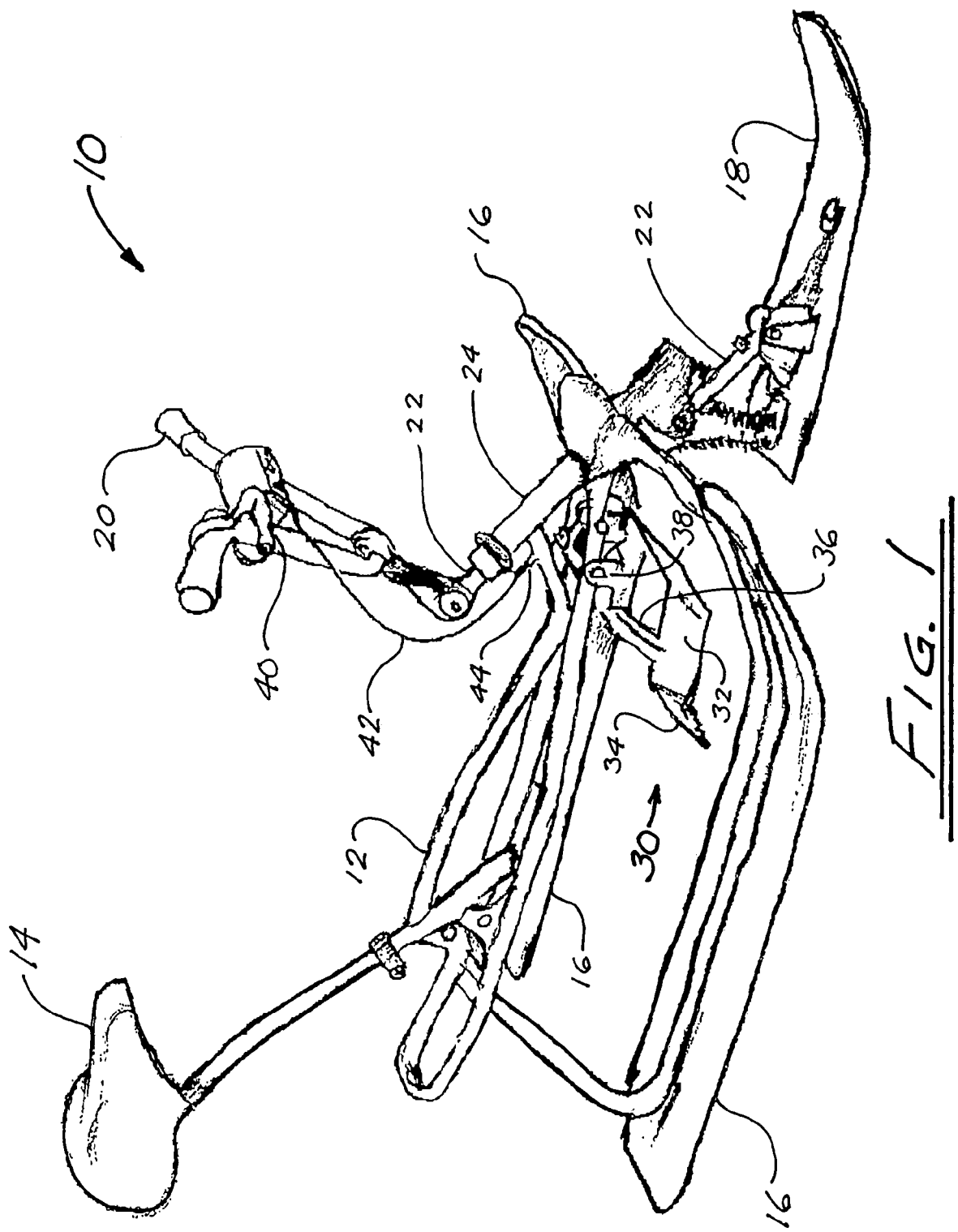
FIG. 1 is a perspective view of a snow sled in accordance with the preferred embodiment of the present invention.

Referring to FIG. 1, the snow sled accordingly to the preferred embodiment of the invention, generally denoted by reference numeral 10, has a frame 12 with a rider's seat 14. In the Figures, frame 12 is shown constructed of welded tubular members; this form construction is desirable to minimize sled weight, but is not essential to the invention. The frame configuration shown in the Figures is exemplary and non-limiting; other frame geometries and construction arrangements may be used without departing from the scope of the invention. Frame 12 may be fabricated using any suitable materials, which may include steel, aluminum, or titanium.

In the illustrated preferred embodiment, the sled 10 has a pair of spaced rear skis 16 suitably fastened to frame 12. The sled 10 also includes a set of handlebars 20 connected to a steering shaft 22 swivellingly disposed within a steering sleeve 24 forming part of frame 12, with the steering shaft 22 being connected at its lower end to a front ski 18. This arrangement allows the rider to steer the sled 10 in much the same fashion as a bicycle. However, a steerable front ski is not essential to the invention. In simpler alternative embodiments, however, handlebars 20 and front ski 18 may be rigidly connected to frame 12 (in which case the rider can steer the sled using weight-shifting methods well known to snow sledders).

The handlebars 20 may be of typical bicycle-style configuration as shown in the Figures, but this is not essential. As used in this patent document, the term "handlebars" should be understood as extending to any device or contrivance that may be conveniently gripped and manipulated by the sled rider for purposes of controlling and maneuvering sled 10, and in this sense the configuration of handlebars 20 is not dependent on whether front ski 18 is steerable. In particular, but without limitation, handlebars 20 may take the form of a steering wheel.

Figure 2:
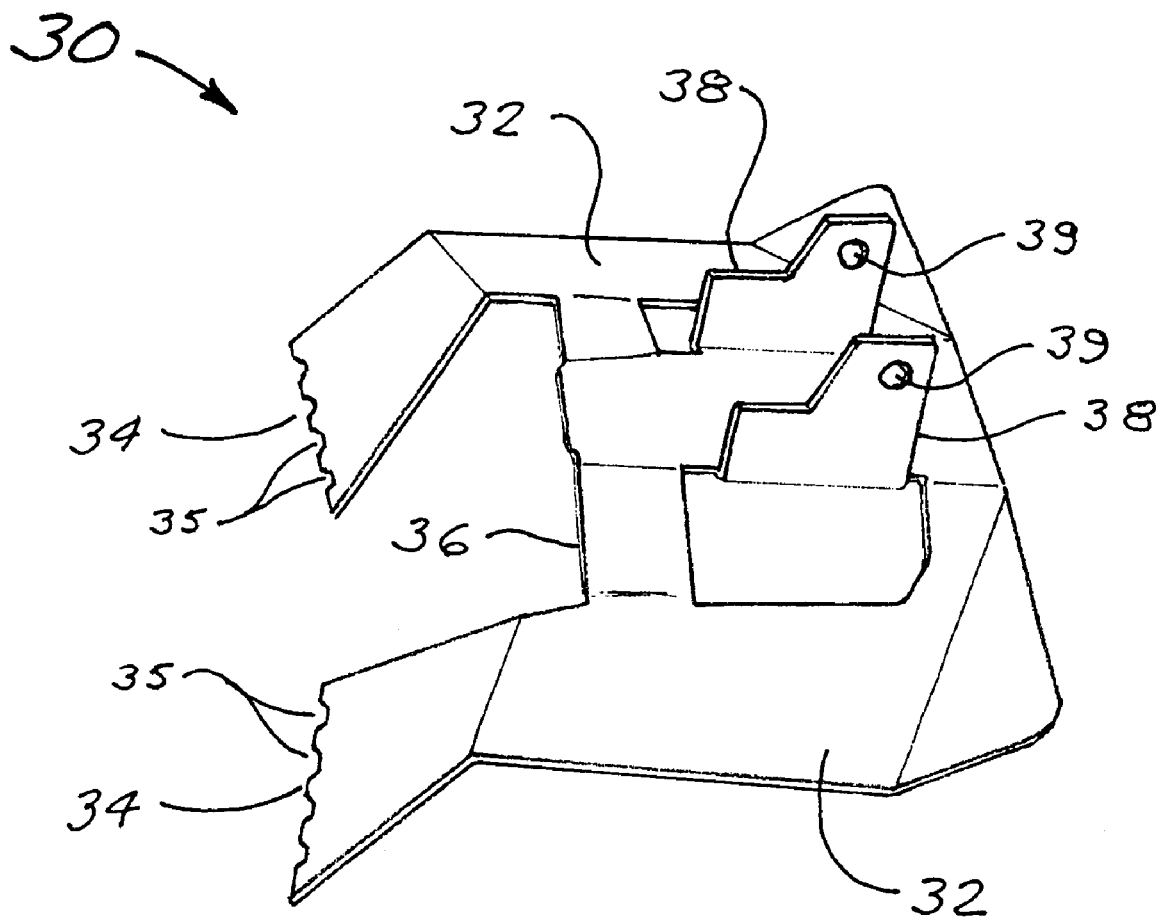
FIG. 2 is a perspective view of a prior art snow sled brake pedal assembly.
Figure 3:
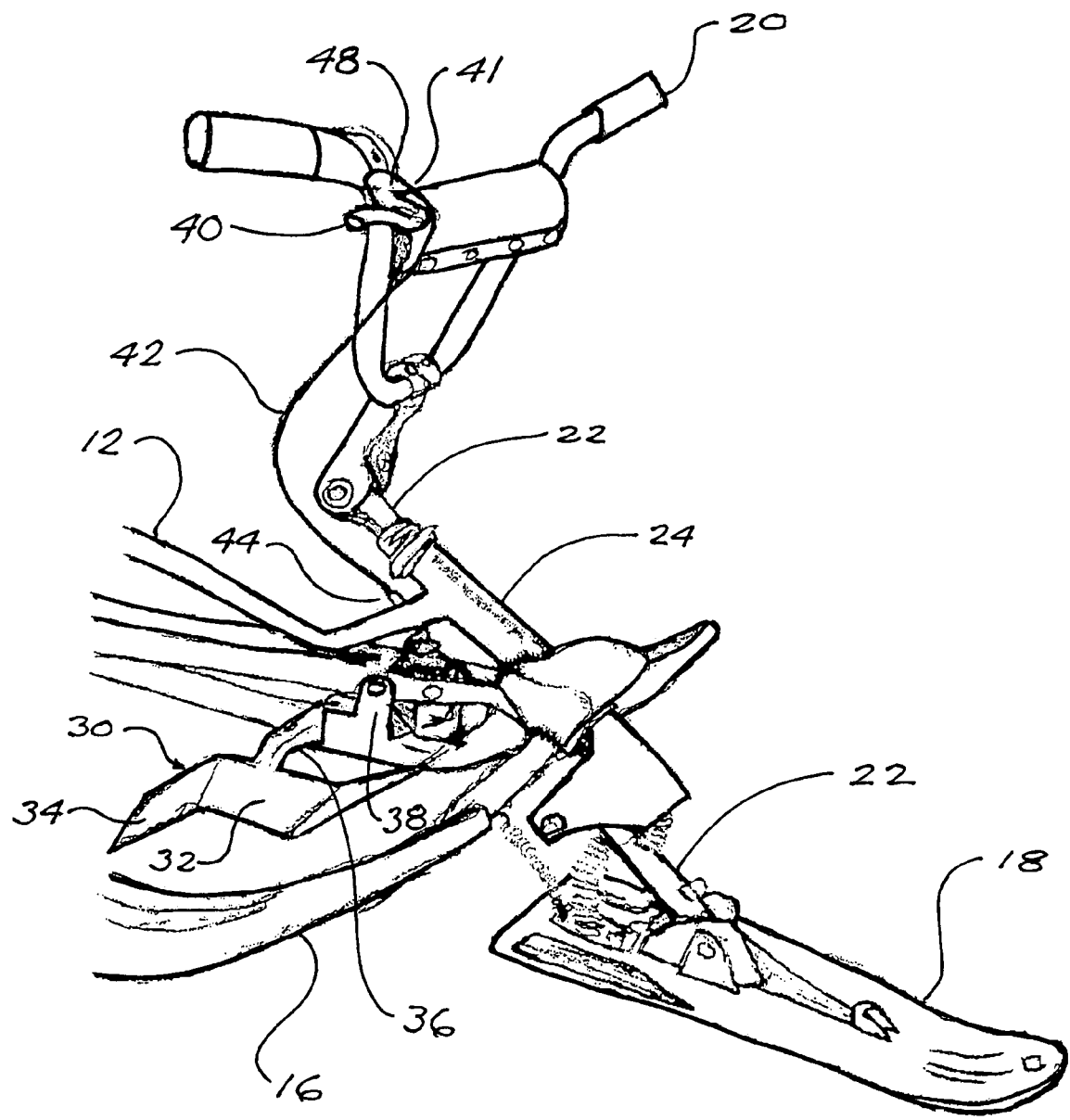
FIG. 3 is a perspective view of the front portion of the slow sled shown in FIG. 1.

Sled 10 includes a pair of brake pedals 30, centrally mounted to frame 12 so as to be readily accessible to the rider's feet. FIG. 2 illustrates an example of a prior art brake pedal construction suitable for use as the brake pedals 30 in the preferred embodiment of the invention. Each brake pedal 30 has a foot rest section 32 and a brake pad section 34 which are rigidly interconnected (either as independent components, or as contiguous components of a unitary assembly as in FIG. 2). The foot rest sections 32 and brake pad sections 34 are proportioned and arranged so that the sled rider's feet may be placed on the foot rest sections 32 with the brake pad sections 34 extending downward and rearward from their corresponding foot rest sections 32. As shown in FIG. 2, there may be an angular displacement between the foot rest sections 32 and brake pad sections 34. However, this is not essential. The foot rest sections 32 and brake pad sections 34 may alternatively be in substantially co-planar relationship. The brake pad section 34. The brake pad section 34 of each pedal 30 need not necessarily extend a substantial distance from the corresponding foot rest section 32 as shown in FIG. 2. The bottom edge of the brake pad section 34 may have notches 35 for enhanced snow-engaging effectiveness.

Figure 4:
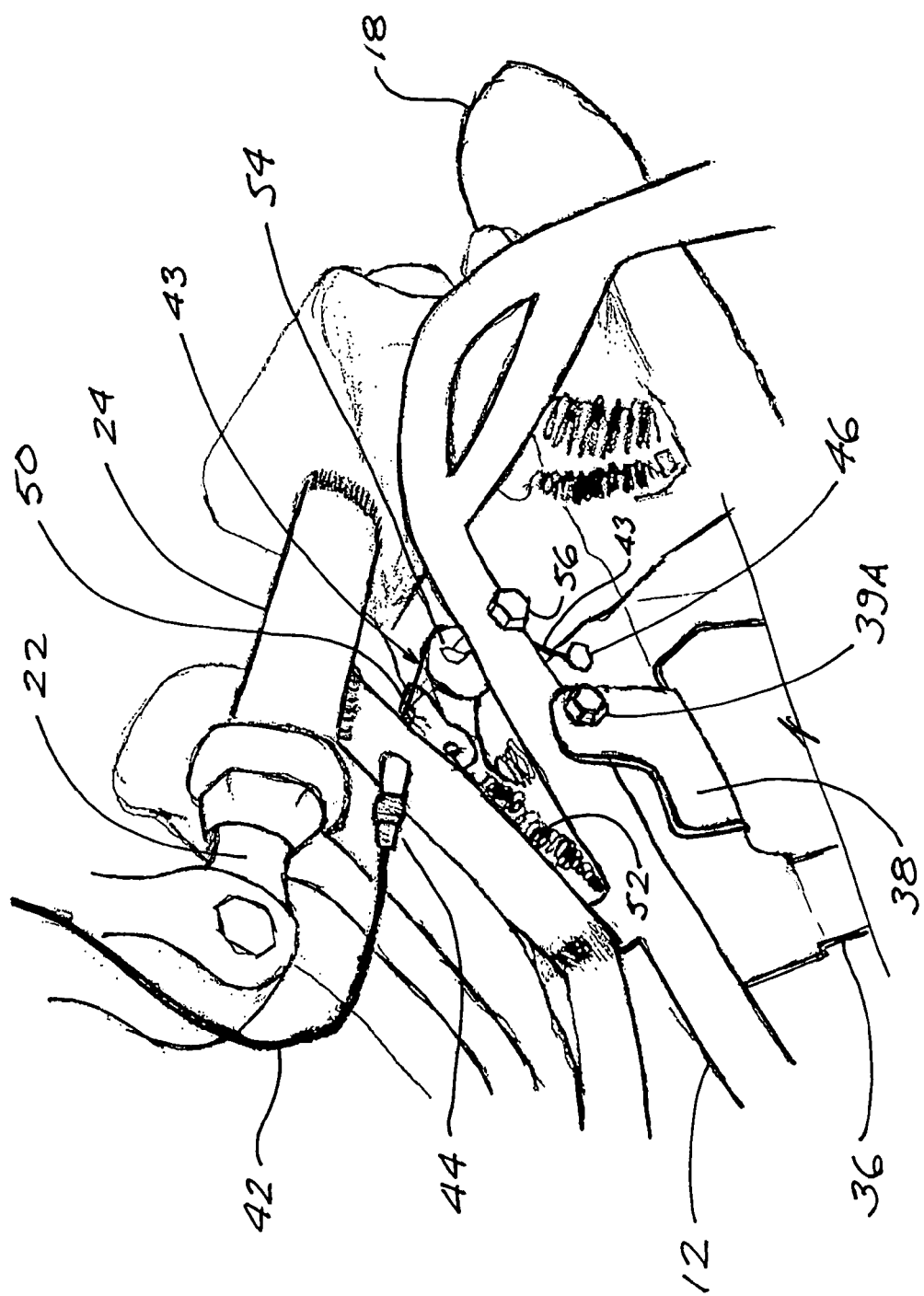
FIG. 4 is a perspective detail illustrating the connection of the brake pedals to the frame of the snow sled and the connection of the brake cable to the brake pedals.
Figure 5:
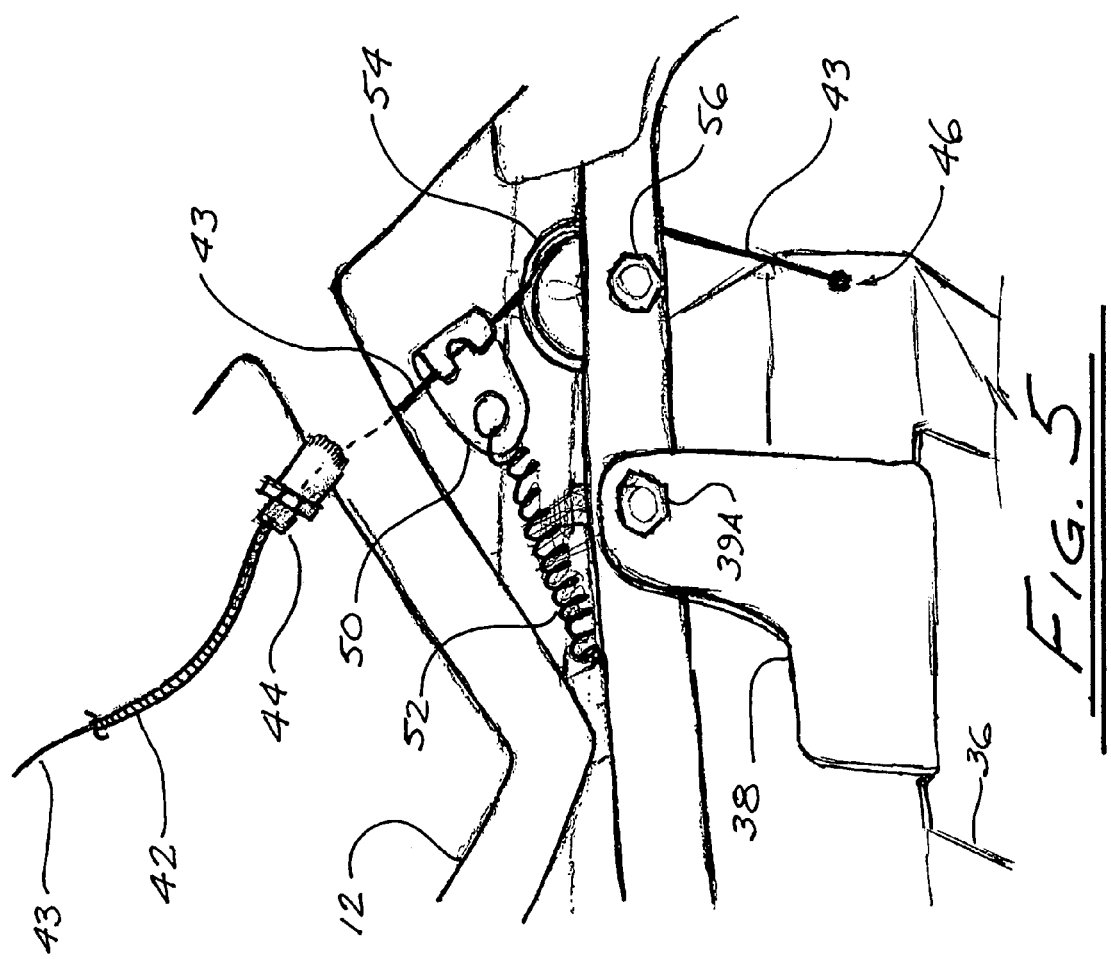
FIG. 5 is a perspective detail further illustrating the connection of the brake cable to the brake pedals, and also illustrating the cable-tensioning means of the preferred embodiment.

The brake pedals 30 are mounted to frame 12 by suitable hinging means such that they are pivotable about a transverse horizontal axis. In the embodiments shown in the Figures, the brake pedal assembly 30 is formed with a pair of hinge brackets 38 to facilitate pivotable mounting to frame 12 using a suitable pin or bolt 39A as best illustrated in FIGS. 4 and 5. Brake pedals 30 are preferably provided with biasing means, for biasing brake pedals 30 toward a neutral position in which the brake pad sections 34 are elevated above the plane formed by the running surfaces of skis 16 and 18, such that they will not engage the snow surface over which sled 10 may be travelling. In the preferred embodiment, the biasing means is a coil spring disposed between frame 12 and a point on the brake pedal assembly 30 aft of its horizontal pivot axis, such that actuation of brake pedals 30 will cause the spring to stretch, and to return brake pedals 30 toward the neutral position upon relaxation of tension in the spring. Various alternative and effective biasing means will be readily apparent to persons skilled in the art.

It may be seen that application of foot pressure to brake pedals 30 will cause brake pedals 30 to rotate about their pivot axis, toward an engaged position in which the lower ends of the brake pad sections 34 are urged into the snow surface over which sled 10 may be travelling, thus generating a braking force tending to slow sled 10. In accordance with the present invention, brake pedals 30 may be actuated by cable-actuated auxiliary brake control means independently of or in combination with foot operation as described above. In the preferred embodiment, as shown in FIGS. 1, 3, 4, and 5, the auxiliary brake control means includes a brake lever housing 48 mounted to handlebars 20, with upper cable sheath retainer means 41 for receiving and retaining a flexible cable sheath 42, such as a cable sheath of the type commonly used for bicycle brake and gear shift controls. A brake lever 40 is hingingly mounted to brake lever housing 48. Cable sheath 42 extends to lower cable sheath retainer means 44 mounted at a selected location on frame 12. Brake cable 43 is connected at one end to a selected attachment point on brake lever 40, and then passes through cable sheath 42, exiting at a selected point on frame 12 near where the brake pedals 30 mount to frame 12. The disposition of brake cable 43 within cable sheath 42, which in turn is restrained by sheath retainers at each end, facilitates the application of tension forces to brake cable 43 in well known manner. The point of attachment of the upper end of brake cable 43 to brake lever 40 is selected such that depression of brake lever 40 will cause partial retraction or withdrawal of the brake cable 43 through the upper end of cable sheath 42.

As best seen in FIGS. 4 and 5, the lower end of brake cable 43 is connected to brake pedal assembly 30 at connection point 46 forward of the assembly's horizontal pivot axis. In the preferred embodiment, brake cable 43 passes over a cable guide element such as idler pulley 54, which is rotatably mounted to frame 12 by means of a suitable pin or bolt 56. When the rider depresses (i.e., squeezes) brake lever 40, will exert a tensile or pulling force on brake pedal assembly 30 at connection point 46, thus moving the brake pedals 30 toward the engaged position.

This mechanism will have optimal operative effectiveness when brake cable 43 is substantially taut, so as to minimize or eliminate slack or "play" in the mechanism. This can be a particular problem when brake pedals 30 have been partially depressed by foot pressure, which will tend to slacken brake cable 43 in the vicinity of its connection to the brake pedal assembly 30. For this reason, the preferred embodiment of the invention include cable tensioning means to keep brake cable 43 substantially taut. In the embodiment illustrated in FIGS. 4 and 5, the cable tensioning means includes cable guide element 50, which hooks around or otherwise engages brake cable 43 in a fashion that allows brake cable 43 to slide relative to guide element 50, plus a tension spring 52, which extends between guide element 50 and a convenient connection point on frame 12. Tension spring 52 is sufficiently pre-tensioned so that it will continue to exert a lateral tension force on brake cable 43 even when brake pedals 30 have been deployed by foot pressure. Alternative means for tensioning brake cable 43 will be readily apparent to persons skilled in the art of the invention. For example, brake cable pulley 54 could be spring-mounted with a bias toward the front of sled 10, thus eliminating the need for a separate cable guide element 50.

It will be readily appreciated by those skilled in the art that various modifications of the present invention may be devised without departing from the essential concept of the invention, and all such modifications are intended to be included in the scope of the claims appended hereto. In particular, it will be appreciated that the invention may be readily adapted to incorporate separate, independently operable left and right brake pedals, with independent auxiliary brake control means.

In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

The invention claimed is:

1. A snow sled, for gliding over a snow surface, said snow sled comprising:
   (a) a frame having a seat for a rider;
   (b) one or more ski runners mounted to the frame;
   (c) handlebar means mounted to the frame;
   (d) a pair of laterally spaced brake pedals, each comprising:
      d.1 a foot rest section having an upper end and a lower end; and
      d.2 a brake pad section having an upper end and a lower end, the upper end of said brake pad section being rigidly connected to the lower end of the foot rest section, such that the brake pad section extends downward and rearward away from the foot rest section;
      said brake pedals being mounted to the frame and pivotable about a horizontal axis transverse to the longitudinal centerline of the frame, with the foot rest sections accessible to the rider's feet; and
   (e) cable-actuated auxiliary brake control means;
wherein the brake pedal may be moved from a neutral position in which the brake pad sections are stowed above the snow surface, to an engaged position in which the lower ends of the brake pad sections are urged into the snow surface, by application of foot pressure to the foot rest sections or by actuation of the auxiliary brake control means.

2. The snow sled of claim 1, further comprising biasing means, for biasing the brake pedals toward the neutral position.

3. The snow sled of claim 1 wherein the brake pedals are interconnected by a bridging member extending laterally between the brake pedals, such that the brake pedals will move in concert upon actuation of the auxiliary brake control means.

4. The snow sled of claim 1 wherein the brake pedals are independently operable by separate auxiliary brake control means.

5. The snow sled of claim 1 wherein the sled has a single front ski and a pair of rear skis, and wherein the sled further comprises steering means associated with the handlebar means, for controlling the directional orientation of the front ski.

6. The snow sled of claim 1 wherein the sled has a single front ski and a pair of rear skis.

7. The snow sled of claim 1 wherein the sled has a pair of front skis and a pair of rear skis.

8. The snow sled of claim 1 wherein the sled has a single ski extending from near the rear of the frame to near the front of the frame, and wherein said ski has at least one brake pedal opening.

9. The snow sled of claim 2 wherein the biasing means comprises a coil spring anchored to the frame.

10. The snow sled of claim 3 wherein the auxiliary brake control means comprises:
   (a) a brake lever assembly mounted to the handlebar means and comprises:
      a.1 a lever housing having an upper sheath retainer; and
      a.2 a lever hingingly mounted to the lever housing;
   (b) a lower sheath retainer mounted to the sled frame;
   (c) a flexible cable sheath extending between the upper and lower sheath retainers; and
   (d) a flexible cable passing through the cable sheath and being connected at one end to the lever and at the other end to the bridging member;
the points of connection of the brake cable to the lever and the bridging member being selected such that depression of the lever will cause partial withdrawal of the brake cable through the upper end of the sheath, and consequently exerting a tensile force on the bridging member so as to move the brake pedals toward the engaged position.

11. The snow sled of claim 10, further comprising cable-tensioning means, for maintaining tension in the brake cable when the brake pedals are operated by foot pressure.

12. The snow sled of claim 11 wherein the cable-tensioning means comprises:
   (a) a cable guide element engaged with the brake cable at a point between the lower cable retainer and the bridging member; and
   (b) a tension spring connected at one end the cable guide element and at the other end to the sled frame;
said spring being pre-tensioned such that the brake cable will remain taut at all times when the level is not depressed, and irrespective of the position of the brake pedals.

13. The snow sled of claim 12 wherein the cable guide element comprises a sleeve within which the brake cable may be slidingly received.

14. The snow sled of claim 5 wherein the steering means comprises a shaft connected at its upper end to the handlebar means and at its lower end to the front ski, said shaft being swivellingly mounted to the frame.

* * * * *